Jan. 11, 1938. W. A. ROEHM 2,104,763
SPRAYING DEVICE AND REFILL FOR SAME
Filed Jan. 23, 1937

INVENTOR.
William A. Roehm
BY
ATTORNEYS.

Patented Jan. 11, 1938

2,104,763

UNITED STATES PATENT OFFICE 2,104,763

SPRAYING DEVICE AND REFILL FOR SAME

William A. Roehm, Lynbrook, N. Y.

Application January 23, 1937, Serial No. 121,963

4 Claims. (Cl. 299—85)

The invention relates to spraying devices and more particularly to a combination of spraying devices and refills in which the insecticide or other chemical used is contained. In the spraying device now commonly used, the insecticide is either mixed with water in a container from which it is sprayed, or when, the insecticide is contained directly in the spraying device, it is generally made in the form of a cake or stick. This method of using the insecticide in cake or stick form has certain disadvantages which it is the object of the present invention to overcome.

In the first place, a great deal of time and labor is expended in thoroughly mixing the insecticide in the base or menstruum in which contained and the correct consistency of such sticks or cakes must be carefully maintained or they will alter their shapes, particularly through hot weather. In the second place, different temperatures of the spray water will act differently upon such sticks or cakes. They will dissolve much more rapidly when the water is relatively warm, than when the water is at a lower temperature. Thus, there is no certainty of the correct mixture of water and insecticide being maintained.

The object of the present invention is to provide a spraying device, in combination with a refill, in which the insecticide is used in a paste form. Another object is to so construct the refill that it may be inserted in and withdrawn from the spraying device with a minimum expenditure of time and labor. A further object is to provide means which will cause the insecticide to be mixed with the water in exact proportions. A still further object is to provide a refill which is relatively inexpensive to manufacture, which can be conveniently handled and stored over long periods of time without deterioration of its contents, and which can not be reused after once having been emptied.

These and various other objects and advantages will be readily understood from the following description and from the accompanying drawing of a preferred embodiment of the invention, in which, however, modifications may be made without departing from the scope of the appended claims. In the drawing Fig. 1 is a cross-sectional, side elevation of the spraying device with the refill inserted therein;

Figure 1:
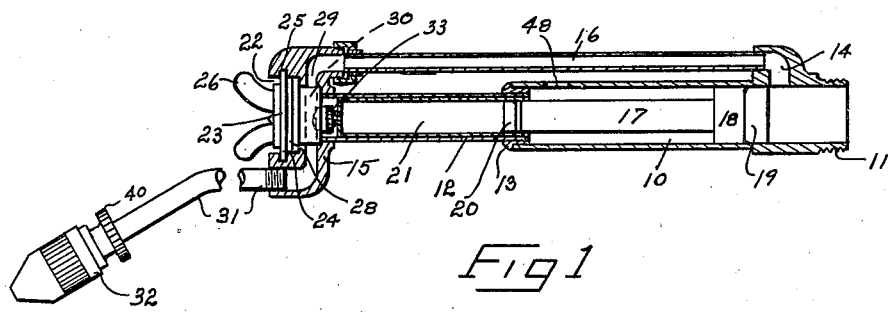

This is a further improvement on my copending application Serial No. 69,774.

Referring now to all the views, the spraying device comprises a large cylinder 10, which is threaded at its outer end 11, and a small cylinder 12 which is permanently secured in the end of the large cylinder by means of a bushing 13. A rear header 14 is shown formed integrally with the rear end of the large cylinder, while the front end of the small cylinder is permanently secured in a front header 15. A by-pass pipe 16 leads from the rear header to the front header.

A stepped piston 17 is reciprocatingly mounted in the two cylinders and is provided with an enlarged portion 18 and a cup-shaped washer 19 which fits slidingly in the large cylinder, and with a cup-shaped washer 20 on the front end of the small piston which fits slidingly inside the refill tube 21. Both cylinders are preferably cylindrical, but may be made of other shapes.

Figure 3:
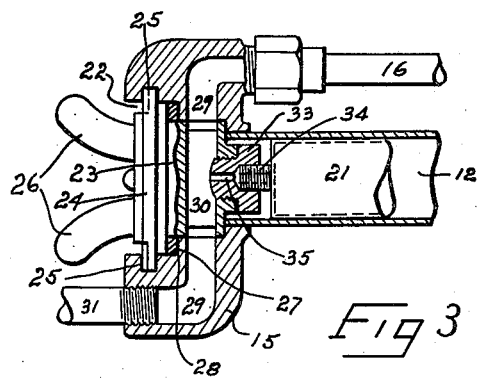
Fig. 3 is a fragmental, cross-sectional view showing certain parts of the spraying device in greater detail.

An opening 22 is formed in the front header and in this opening a stopper 23 is inserted. This stopper is held tightly in place by means of a swivel 24 which engages in notches 25. When the finger grip 26 on the swivel is turned, the stopper is sealed against the seat 27 by means of a resilient washer 28. A passage 29 is formed through the front header and an opening 30 is formed in the rear end of the stopper. This opening aligns with the passage 29 so that water from the by-pass pipe 16 may flow through the passage 29 and through this opening into a pipe 31 connected with the nozzle 32. A bushing 33 is preferably employed in the rear of the stopper. The threaded nipple 34 of the refill tube 21 is screwed in a threaded opening in this bushing, so that the refill tube will be held in the position plainly shown in Fig. 3. A small orifice 35 is drilled through the bushing.

Figure 7:
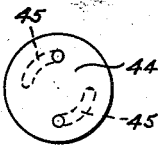
Fig. 7 is a side view of the refill tube.

The refill tube itself is shown in Fig. 7. It is provided with an internally threaded cap 36 which is screwed on the threaded nipple 34 and, after being filled, a closure cap 37 is inserted in the other end. The tube is made of very light metal, as shown. The knurled closure cap is preferably provided with a part which enters the tube so as to prevent it from being distorted from its cylindrical shape.

When the spraying device is connected to a source of water supply, as for example by having its end 11 attached to a garden hose, the water will flow into the large cylinder and force the pistons forward. However, as the front end of the small piston is inserted in the refill tube, the pressure exerted by the water is transferred to the contents in the tube so that this is slowly forced out through the small orifice 35 in the bushing 33. At the same time as this pressure is being exerted on the pistons, water will flow through the rear header, by-pass 16, channel 29, and through the opening 30 in the stopper, where it encounters the insecticide paste extruded from the refill tube. This paste is dissolved in the water and the solution is carried to the nozzle 32 through the pipe 31, and expelled from the nozzle.

As previously said, the bushings 33 are preferably made interchangeable so that bushings with various sized apertures may be employed for various kinds of insecticides. The smaller the orifice the slower will be the extrusion of the insecticides and consequently the weaker the mixture sprayed.

Figure 2:
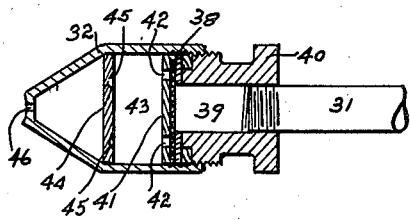
Fig. 2 is a cross-sectional, side view of the nozzle employed with the spraying device.
Figures 4, 5, 6:
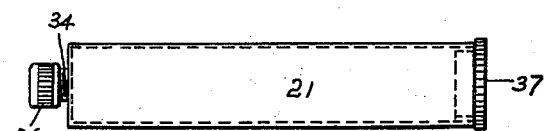
Fig. 4 is a rear view of the stopper assembly of the spraying device.
Fig. 5 is a rear view of a certain washer employed in the nozzle.
Fig. 6 is a side view of an interchangeable bushing employed in the device.

The nozzle shown in cross-section in Fig. 2 will now be described. To further assure a thorough mixing of the water and the insecticide, a screen 38 is placed over the opening 39 in the rigid part 40 of the nozzle which is threaded on the pipe 31, and in front of this screen a disk 41 is placed. This disk is provided with two relatively small openings 42 through which the mixture must pass, after having passed through the screen 38. The screen 38 is made of wire mesh so that the mixture may flow through the mesh to the holes 42. The screen and the disk 41 are secured to the end of part 40, in any suitable manner, while the disk 44 is secured to the nozzle 32. The mixture now enters a chamber 43 in the nozzle and is forced through another disk 44 in which arcuated openings 45, such as plainly indicated in Fig. 5, are formed. This imparts a rotary motion to the mixture before it is expelled through the orifice 46 of the nozzle. The nozzle itself is threaded on the part 40 so that it may be adjusted for various sprays.

Figure 8:
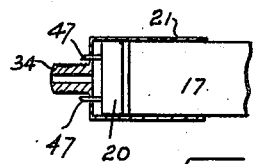
Fig. 8 is a fragmental, cross-sectional, side view of the refill tube showing certain details of construction.

I preferably insert two sharp-pointed prongs 47 in the front end of the small piston so that, after the contents have been completely extruded from the refill tube the pressure of the water on the large piston will cause these prongs to pierce the refill tube, as shown in Fig. 8, thus preventing it from being used again.

I also preferably form an opening 48 in the large cylinder and color or otherwise make the enlarged portion 18 prominent, so that it may be seen through the opening and thus indicate when the refill tube is empty.

Having described the invention and its objects, what I claim as new and wish to protect by Letters Patent is:—

1. A spraying device of the class described comprising a rear header, having means for connecting it to a source of water supply; a front header; a stepped cylinder connected between the said headers with its large end connected to the rear header; a stopper removably inserted in the front header; an open-ended refill tube, containing the spraying material to be mixed with the water passing through the device, inserted in the small cylinder with its front end secured in said stopper; a stepped piston operatively engaged in the large cylinder and with its small end engaged in the refill tube; a passage formed transversely through the stopper; an orifice formed in the rear of the stopper through which the material from the tube is extruded; a by-pass leading from the rear header to the front header for carrying water through the passage in the stopper to mix with the material extruded from the refill tube by the action of the piston; and a nozzle for discharging the solution from the device.

2. A spraying device of the class described comprising a rear header, having means for connecting it to a source of water supply; a front header; a stepped cylinder connected between the said headers with its large end connected to the rear header; a stopper removably inserted in the front header; an open-ended refill tube, containing the spraying material to be mixed with the water passing through the device, inserted in the small cylinder with its front end secured in said stopper; a stepped piston operatively engaged in the large cylinder and with its small end engaged in the refill tube; a passage formed transversely through the stopper; an orifice formed in the rear of the stopper through which the material from the tube is extruded; a by-pass leading from the rear header to the front header for carrying water through the passage in the stopper to mix with the material extruded from the refill tube by the action of the piston; a nozzle for discharging the solution from the device; and a screen located transversely in the nozzle for mixing and straining the solution.

3. A spraying device of the class described comprising a rear header, having means for connecting it to a source of water supply; a front header; a stepped cylinder connected between the said headers with its large end connected to the rear header; a stopper removably inserted in the front header; an open-ended refill tube, containing the spraying material to be mixed with the water passing through the device, inserted in the small cylinder with its front end secured in said stopper; a stepped piston operatively engaged in the large cylinder and with its small end engaged in the refill tube; a passage formed transversely through the stopper; an orifice formed in the rear of the stopper through which the material from the tube is extruded; a by-pass leading from the rear header to the front header for carrying water through the passage in the stopper to mix with the material extruded from the refill tube by the action of the piston; a nozzle for discharging the solution from the device; and means associated with the front end of the small piston for rupturing the refill tube after its contents has been extruded.

4. A spraying device of the class described comprising a rear header, having means for connecting it to a source of water supply; a front header; a stepped cylinder connected between the said headers with its large end connected to the rear header; a stopper removably inserted in the front header; an open-ended refill tube, containing the spraying material to be mixed with the water passing through the device, inserted in the small cylinder with its front end secured in said stopper; a stepped piston operatively engaged in the large cylinder and with its small end engaged in the refill tube; a passage formed transversely through the stopper; an orifice formed in the rear of the stopper through which the material from the tube is extruded; a by-pass leading from the rear header to the front header for carrying water through the passage in the stopper to mix with the material extruded from the refill tube by the action of the piston; a nozzle for discharging the solution from the device; and means associated with the large piston and cylinder for indicating when the refill tube is empty.

WILLIAM A. ROEHM.